(No Model.)  3 Sheets—Sheet 1.
J. F. DE BAUW.
ELECTRIC METER.

No. 587,798. Patented Aug. 10, 1897.

Witnesses:
E. B. Bolton

Inventor:
Jean François de Bauw
By Richards
his Attorneys (No Model.) 3 Sheets—Sheet 2.
J. F. DE BAUW.
ELECTRIC METER.
No. 587,798. Patented Aug. 10, 1897.
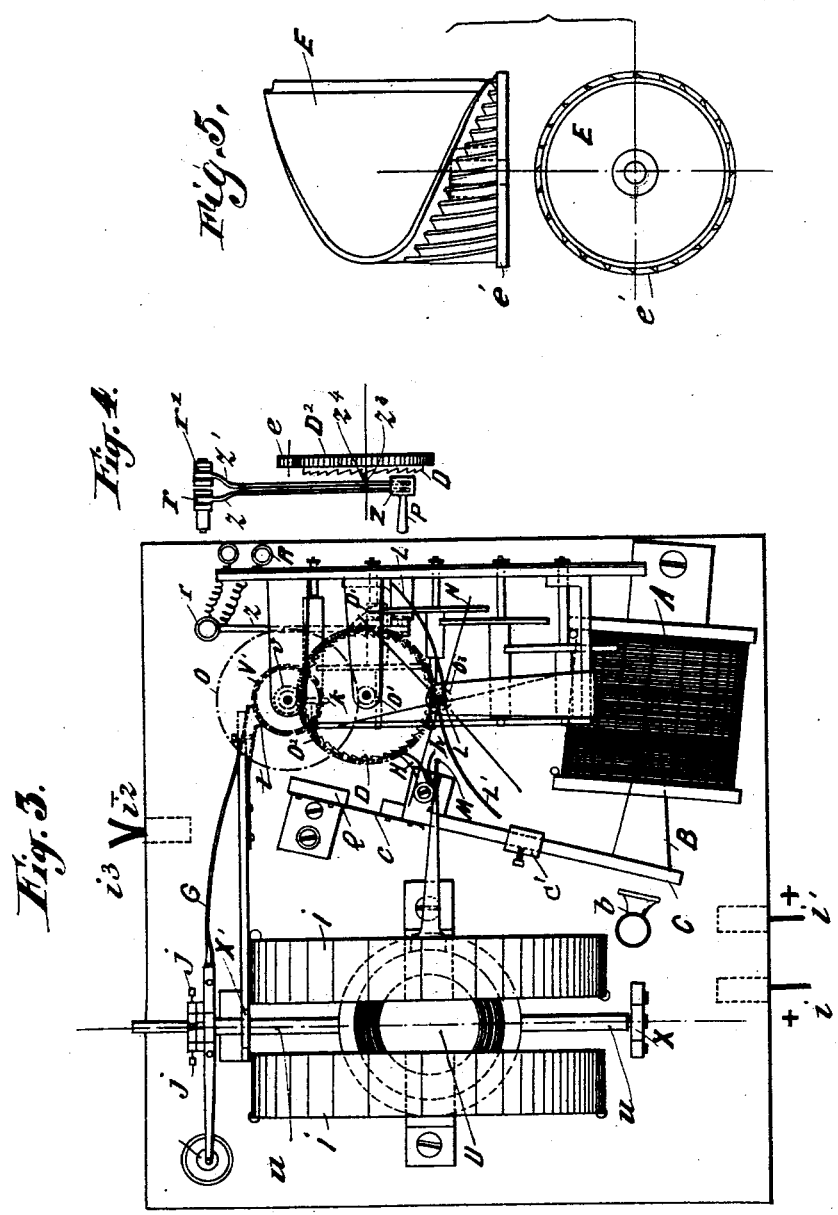
Witnesses:
E. B. Bolton
Otto Munk
Inventor:
Jean François De Bauw
By Richardson
his Attorneys.

(No Model.) 3 Sheets—Sheet 3.

J. F. DE BAUW.
ELECTRIC METER.

No. 587,798. Patented Aug. 10, 1897.

Witnesses
E. B. Bolton

Inventor:
Jean François De Bauw
By Richards
his Attorneys.

UNITED STATES PATENT OFFICE.

JEAN F. DE BAUW, OF BRUSSELS, BELGIUM.

ELECTRIC METER.

SPECIFICATION forming part of Letters Patent No. 587,798, dated August 10, 1897.

Application filed April 26, 1897. Serial No. 633,989. (No model.) Patented in Belgium August 29, 1896, No. 123,264.

*To all whom it may concern:*

Be it known that I, JEAN FRANÇOIS DE BAUW, a subject of the King of Belgium, residing at Brussels, Belgium, have invented new and useful Improvements in Electric Meters, (for which I have obtained a patent in Belgium, No. 123,264, dated August 29, 1896,) of which the following is a specification.

This invention relates to an electric meter which is adapted to record the smallest consumption of current with considerable accuracy, while not requiring any appreciable consumption of current for the purpose of operating the recording apparatus and which shall be capable of being adjusted to suit the potential of the current. This meter consists, essentially, of an ammeter, which is included in the electric circuit and the pointer of which is connected to a dial registering apparatus of ordinary construction by means of a special apparatus that forms the characteristic feature of the present invention. As soon as a current passes into the circuit this special apparatus is disengaged by the pointer of the ammeter and as the result of the expansion of a spring causes the pointers of the registering-dials to advance through an angle or angles corresponding to the quantity of electricity that passes during each minute or fraction of a minute through the ammeter.

In order to enable my invention to be clearly understood, I will proceed to describe the same with reference to the accompanying drawings, in which—

Figure 1:
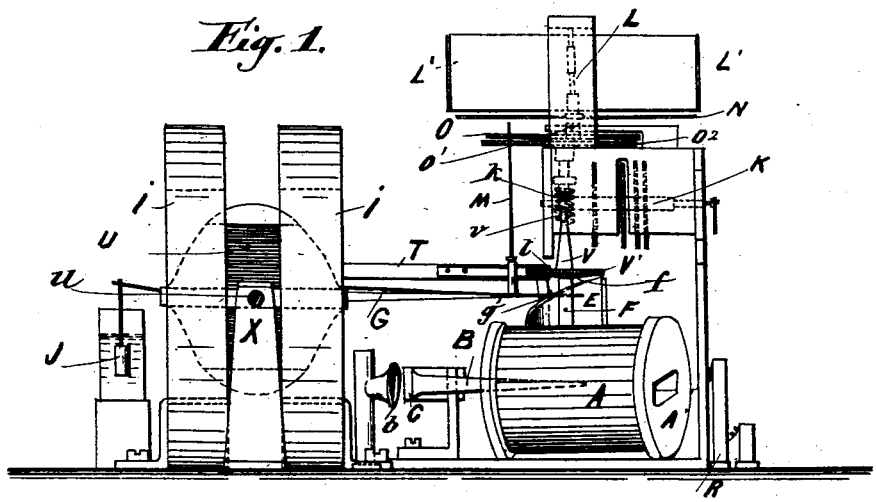
Figure 2:
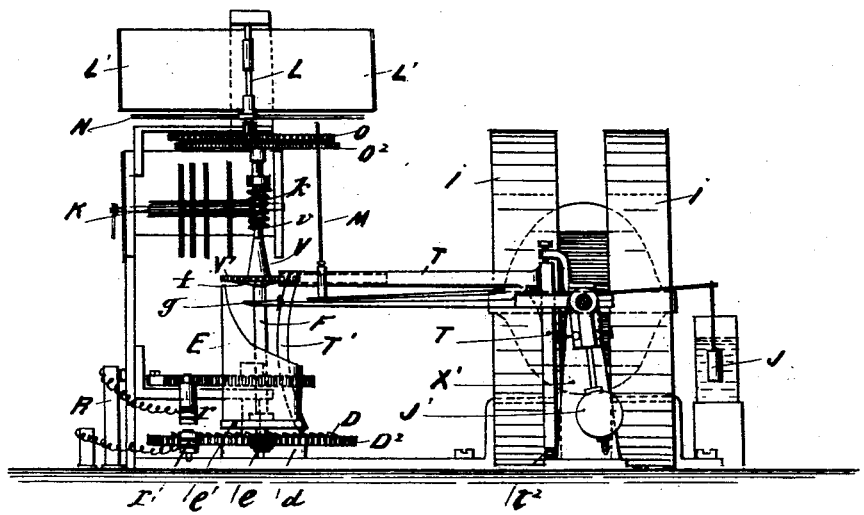
Figure 6:
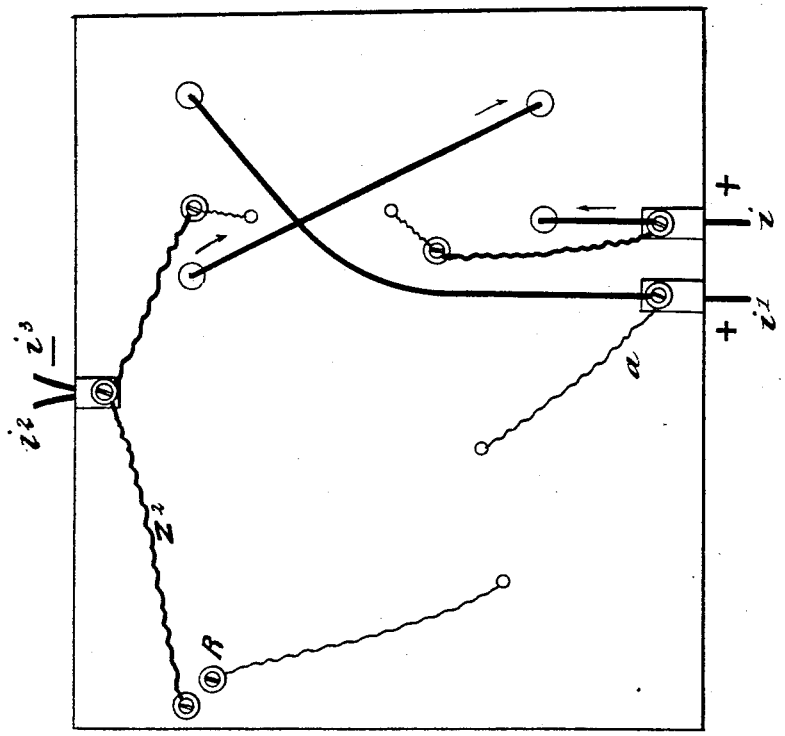

Figure 1 is an elevation of the meter as seen from the left-hand side. Fig. 2 is a similar view of the same as seen from the right-hand side, certain parts being omitted for the sake of clearness. Fig. 3 is a plan. Figs. 4 and 5 are views showing certain details of the apparatus, and Fig. 6 is an under side view of the meter.

I I are the vertical bobbins of the ammeter, and U is the inner bobbin, which rocks on an axle $u$, carried by journals in bearings X and X'.

G is the pointer, fixed on the axle $u$, so that the rotation of the latter under the influence of the passage of a current depresses the point of the pointer proportionately to the intensity of the said current. The pointer G is prolonged beyond the axle $u$, and from the end of its prolongation there is suspended a counterweight J, which may be immersed in a liquid, as shown. Another counterweight J, which is adjustable vertically and laterally by means of screws $jj$ and is suspended from the axle $u$, enables the position of the point of the pointer, when no current is passing in the circuit, to be adjusted.

$i$ is the conductor of electricity, which conveys the positive current to the ammeter, and $i'$ is the conductor by which the current leaves the ammeter to go to the lamp or lamps or other place where it is to be used.

$i^2$ $i^3$ are the conductors for the negative current. A thin wire $a$, connected to the conductor $i$, acts as a shunt through which a small portion of the positive current passes through a bobbin or solenoid (hereinafter referred to as a "bobbin") A, having a hollow core A', which constitutes the magnetic field of the apparatus that operates the registering apparatus. Into the hollow of the core A' there enters one end of an armature B, of soft iron, fixed at its other end to one end of a horizontal rod C, preferably of copper, the other end of which is connected to a support Q by means of a small piece $c$ of flexible steel, constituting a spring.

When a current passes through the bobbin A, the armature B is alternately attracted into the hollow of the said bobbin and forced back out of the bobbin against a rubber stop $b$, thereby imparting to the rod C a to-and-fro motion about its support Q. This oscillation of the armature B is caused by a contact device $r$ $r'$, hereinafter described, which alternately interrupts and reëstablishes the circuit through the bobbin, acting in conjunction with the spring $c$, which draws back the armature out of the bobbin whenever the circuit is interrupted. Upon the rod C, near its flexible attachment $c$, there is jointed a pawl H, the free end of which is engaged and pressed by a spring $h$ between the teeth of a ratchet-wheel D, provided with a detent D' and keyed at the top of a short vertical axle, around which is coiled a spiral spring inclosed in a cylinder $d$. (See Fig. 2.) Each time the armature B is attracted into the bobbin A the oscillation of the rod C pushes the pawl H against the ratchet-wheel D and causes the latter to move forward through the distance of one tooth and thereby compresses the spiral spring to a corresponding extent.

By means of suitable gearing the spiral spring of the cylinder $d$ in expanding rotates a toothed pinion $e$, Fig. 2, formed on the lower portion of a vertical shaft F, whose lower end is journaled in the base-plate of the meter and whose upper end turns in an aperture in a small support fixed to the frame of the registering-dials.

On the shaft F, above the pinion $e$, there is keyed a circular disk $e'$, and around the edge of this disk $e'$ there is fixed, by means of the long side of its right angle, a small sheet of metal E, which is cut in the shape of a right-angled triangle arranged concentrically to the shaft F in such a manner that the short side of the right angle of the triangle is vertical, while the long side is bent to a circle, so that both ends meet.

The point of the pointer G of the ammeter is directed so as to touch the cylinder described by the short side of the triangle E when the disk $e'$ turns, and by means of its adjustable counterweight J' the position of the pointer G is regulated in such a manner that when no current is passing in the apparatus the height of its point will coincide exactly with the top of the short side of the triangle E. The pointer G is provided near its point, on the side turned toward the shaft F, with a small stop $g'$, which comes into contact with the surface of the triangle E when the disk $e'$ turns. In the support X' of the axle $u$ there is pivoted the upright of a cross-stay T, whose arm passes above the pointer G and makes with it a very acute angle and which is constantly pressed toward the shaft F by means of a small spiral or coiled spring $t^2$.

The arm of the stay T extends horizontally nearly to the point of the pointer G and ends in a dependent arm T', bent to the arc described by the point of the pointer when it is depressed by the passage of a current.

The pointer G is provided, near its point and at the side turned away from the shaft F, with a small catch $g$, which rests against the depending arm T' of the stay and slides along the latter when the pointer is depressed. From the level of the horizontal arm of the stay T to its upper end the diameter of the shaft F is reduced, and on its thinner portion there is mounted a small perforated spring $f$, which rests on the shoulder formed by the thinning of the shaft and the two limbs of which are curved upwardly. Upon the curved limbs of the spring $f$ there rests a toothed wheel V', fixed on the lower part of a sleeve V, that is free to turn on the thin portion of the shaft F, and the top of which carries a worm $v$, gearing into a vertical wheel $k$, that drives the whole of the clockwork of the registering-dials.

The horizontal arm of the stay T is provided near its end, on the side turned toward the shaft F, with a small laterally-projecting catch $t$, that engages between the teeth of the wheel V' and thereby prevents the rotation of the latter. As shown in Fig. 3, this catch may be formed by a small spring the projection of which is capable of adjustment by means of a screw.

The vertical shaft F, driven by the expansion of the spiral spring in the cylinder $d$, as above stated, carries at its upper end a toothed wheel O, which, through the medium of pinions and toothed wheels O' O² O³, transmits the rotary motion of the shaft F to a small vertical shaft L, carrying a fly L'. This shaft L is also provided under the fly with a star N composed of light radial rods.

To the internal bobbin U of the ammeter there is fixed a bent or cranked rod M, which shares the oscillations of the said bobbin and consequently of the pointer G. When no current is passing in the ammeter, the free end of the rod M passes through the plane of the branches of the star and thus prevents the rotation of the latter, the shaft L, the fly L', the shaft F, and consequently stops the expansion of the spring in the cylinder $d$.

When the current passes in the circuit, the inner bobbin U of the ammeter in oscillating depresses both the rod M and the pointer G and the expansion of the spring immediately rotates the vertical shaft F, which moves with it in its rotation the triangle E, the star N, and the fly L.

The spring is wound up once for all when the apparatus is set, and during the working of the meter its expansion should always be exactly compensated by the tension produced by the oscillations of the armature, as above described.

As the point of the pointer when in its highest position is situated exactly on a level with the top of the short side of the triangle E, therefore as soon as it is depressed, however small such depression may be, its lateral stop $g'$ will necessarily come into contact with a part of the curved surface of the triangle E when the latter rotates with the shaft F, and the more the pointer is depressed by the strength of the current passing in the circuit the greater will be the surface of the triangle E which will come into contact with the stop $g'$ and the longer will such contact last. As soon as the vertical edge of the triangle E in revolving meets the stop $g'$, which has an inclined surface on that side, it will push it back outwardly until its apex or edge rests on the curved surface of the said triangle, and at the same time it also pushes back the pointer G, whose body pushes back in turn the stay T and disengages the stop $t$ of the latter from the teeth of the wheel V', which is then caused to share the rotation of the shaft F. With it there rotates the sleeves V, whose worm $v$ then rotates the toothed wheel $k$, that drives the clockwork of the registering-dials K.

As soon as the stop $g'$ of the pointer G ceases to be in contact with the surface of the triangle E the stay T is returned by its spring $t^2$ toward the shaft F and returns the pointer to its original position, its catch $t$ engaging anew between the teeth of the wheel V' and stopping the latter, as also the sleeve V, the worm $v$, and the wheel $k$, that operates the registering-pointers. The consequence is that the registering-pointers record the passage of the current only during the contact of the triangle E with the stop of the pointer G. If, therefore, the spring in the cylinder $d$ is adjusted in such a manner that the disk $e$ and the triangle E will make one revolution per minute, for example, the dials will record in the course of each minute a greater or less consumption, according as the pointer be more or less depressed before its stop comes into contact with the triangle—that is to say, a consumption proportionate to the strength of the current passing in the circuit.

When the outer surface of the triangle E is smooth, the meter records for the whole of the minute a uniform consumption, according to the strength of the current at the moment at which the stop of the pointer comes into contact with the triangle, but an exact record for any desired fraction of a minute may be obtained by using a triangle whose surface presents, as shown in Fig. 5, a succession of angular grooves connected together by straight planes and described according to the curve traversed by the point of the pointer in moving up and down on the surface of the triangle.

Every time that during the rotation of the triangle E the stop $g'$ of the pointer passes beyond the top of one of the grooves it will lose contact with the triangle, and if the strength of the current has varied during its contact with the inclined portion of the groove the pointer will be free to ascend or to descend in proportion before the spring of the stay has moved the stop $g'$ back into contact with the surface of the next following groove. If, therefore, for instance, the triangle when making one revolution per minute has its surface divided into thirty successive sections or angular grooves the pointer will be able to move down or up every two seconds if variations occur in the strength of the current.

In order that the apparatus may be able to serve for recording the consumption of currents of different potentials, the spring-rod C of the armature carries a weight in the form of a runner or traveler C', whose position can be adjusted on the said rod so as to vary the resistance of the magnet to the current of the bobbin A in proportion to the potential of the current passing through the apparatus. The more this potential rises the nearer the weight C' should be moved toward the armature.

The current, taken as a shunt to the conductor $i$ for energizing the bobbin A, after having passed through the latter passes to the terminal R and thence to the upper contact $r$ of a pair of contacts $r\ r'$, fixed, respectively, to levers $z\ z'$, pivoted to a block $z$, which may be made to oscillate forward or backward by means of a handle P for the purpose of regulating the relative position of the contacts. The latter are preferably covered with platinum, with the object of preventing oscillation.

A wire $z^2$, Fig. 6, connects the lower contact with the negative pole of the apparatus.

The upper surface of the wheel $D^2$, that drives the pinion of the vertical shaft F, is provided around its periphery with a rack having angular vertical teeth between which rest, one behind the other, fingers $z^3\ z^4$, projecting under the levers $z$ and $z'$ in such a manner that when the wheel $D^2$ rotates, in consequence of the expansion of the spring, the inclined surface of its angular teeth raises the fingers $z^3\ z^4$, which fall back, one after the other, to the bottom of the following tooth, and when the second finger $z^3$, fixed to the upper lever $z$, falls back, the first finger $z^4$ being already moved forward a certain distance on the inclined surface of the following tooth, the upper contact $r$ will touch the lower contact $r'$. The circuit is therefore remade.

Having fully described my invention, what I claim, and desire to secure by Letters Patent, is—

1. In an electric meter, the combination of a solenoid or bobbin which has a hollow core and through which passes a shunt-current from the main current, a current-interrupter for rendering this current intermittent, a soft-iron armature one end of which enters the hollow center of the bobbin, a flexible rod suitably supported and attached to the other end of the armature, and a spring-pawl fixed to the said flexible rod, a ratchet-wheel engaged by said pawl, a shaft carrying the ratchet-wheel, a spring controlling said shaft, the entire arrangement being such that the passage of the current in the bobbin produces a to-and-fro movement of the armature and of the flexible rod, whose pawl, each time the armature is attracted by the bobbin, causes the ratchet-wheel to partly rotate, thereby producing a proportionate tension in the spring coiled round the said shaft.

2. In combination in an electric meter, an ammeter having a pointer which will be depressed proportionately to the strength of the current passing in the same, one or more recording-dials, actuating-gearing therefor, a shaft, a worm free to rotate about the same, a spring controlling said shaft, a circular disk fixed on the shaft, a plate cut out in the form of a right-angle triangle and having the long side of its right angle curved to a circle and fixed to the said disk, a stop having an inclined surface projecting from the side of the pointer of the ammeter and touching the cylindrical surface of the triangular curved plate, means for stopping the rotation of the vertical shaft and of the triangle when the passage of the current through the ammeter is interrupted, a current-interrupter, means for stopping the rotation of the worm on the said vertical shaft when the pointer is not in contact with the surface of the triangle, means for rotating the vertical shaft, and the triangle as soon as current passes into the ammeter, and means for rotating with these latter the worm that operates the registering device when the stop on the side of the pointer of the ammeter comes into contact with the surface of the triangle, substantially as described.

3. In combination in an electric meter, an ammeter having a pointer which may be depressed proportionately to the strength of the current passing in the same, one or more recording-dials, actuating-gearing therefor, a shaft, a worm free to rotate about the same, a spring controlling said shaft, a circular disk fixed on the shaft, a plate cut out in the form of a right-angle triangle and having the long side of its right angle curved to a circle and fixed to the said disk, a stop having an inclined surface projecting from the side of the pointer of the ammeter and touching the cylindrical surface of the triangular curved plate, means for stopping the rotation of the vertical shaft and of the triangle when the passage of the current through the ammeter is interrupted, a current-interrupter, means for stopping the rotation of the worm on the said vertical shaft when the pointer is not in contact with the surface of the triangle, means for rotating the vertical shaft and the triangle as soon as current passes into the ammeter, and means for rotating with these latter the worm that operates the registering-disks when the stop on the side of the pointer of the ammeter comes into contact with the surface of the triangle, the said triangle having its surface divided into a series of angular grooves parallel to the arc described by the free end of the pointer of the ammeter under the influence of the passage of a current, substantially as described.

In witness whereof I have hereunto set my hand in presence of two witnesses.

J. F. DE BAUW.

Witnesses:
   H. T. E. KIRKPATRICK,
   J. S. KIRKPATRICK.